Patented Aug. 28, 1945

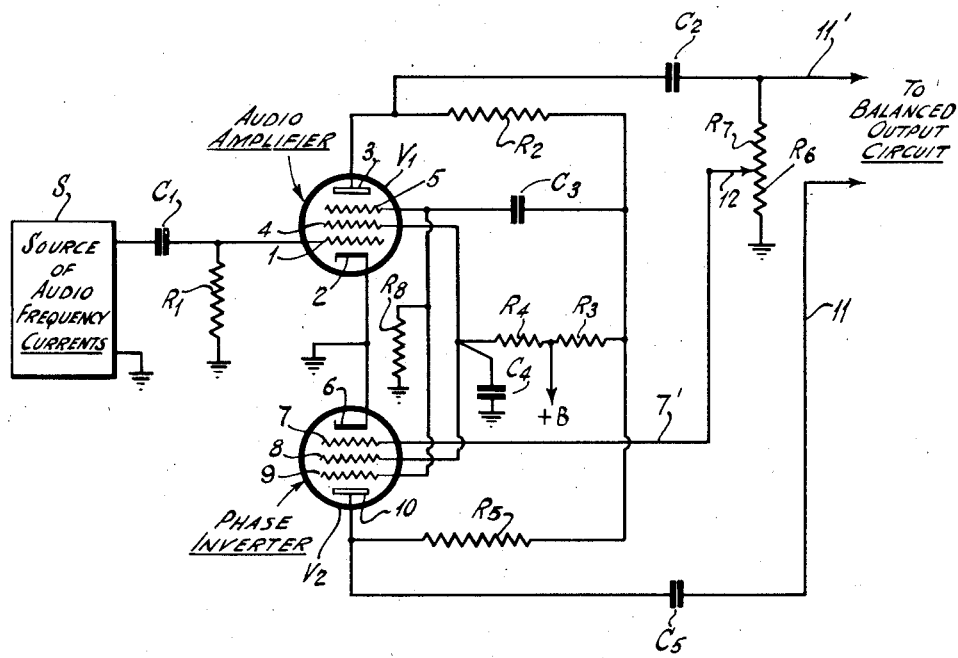

2,383,846

UNITED STATES PATENT OFFICE 2,383,846

SELF-BALANCING INVERTER CIRCUIT

James Bruce Crawley, Washington, D. C., assignor to Radio Corporation of America, a corporation of Delaware Application April 15, 1944, Serial No. 531,268

6 Claims. (Cl. 179—171)

My present invention relates generally to a circuit for coupling a source of alternating current, unbalanced relative to a reference potential point, to an output circuit which is substantially balanced relative to said reference point.

In the past it has been known to employ a phase inverter circuit for coupling a relatively unbalanced (relative to a reference potential point such as ground) source of low frequency currents to a utilization circuit which is balanced relative to the reference potential point. Generally speaking, a phase inverter circuit of the type to which this invention pertains may be classified as a push-pull circuit. This follows from the fact that the inverter circuit output terminals may be connected to a push-pull amplifier. In operation of phase inverter circuits it has been found desirable to provide measures to overcome the effect of unbalance currents in the outputs of the inverter circuit tubes. Hence, various means have been proposed in providing a measure of self-balancing of the inverter stage so as to have the output currents of the two tubes employed in the phase inverter stage substantially equal.

It is an important object of my present invention to provide a simple, economical and substantially effective method of, and circuit for, overcoming phase inverter unbalance.

A further object of my invention is to utilize an auxiliary grid in each tube of a phase inverter stage as the effective element for reducing unbalance.

A more specific object of my invention is to provide a phase inverter tube in association with an audio frequency amplifier tube so as to permit the output circuits of the tubes to feed into a push-pull circuit, together with means for applying in effectively opposite phases to gain control electrodes of said tubes any unbalance currents appearing in said common output circuit.

A still more specific object of my invention is to utilize regenerative feedback of unbalance currents, in a phase inverter stage, to the suppressor grid of one tube, and to utilize degenerative feedback of unbalance currents to the suppressor grid of the second tube of said stage.

The novel features which I believe to be characteristic of my invention are set forth with particularity in the appended claims; the invention itself, however, as to both its organization and method of operation will best be understood by reference to the following description, taken in connection with the drawing, in which I have indicated diagrammatically a circuit organization whereby my invention may be carried into effect.

Referring now to the drawing, let it be assumed that the source of alternating currents to be amplified is unbalanced relative to a reference potential point, such as ground. The source S may be any single-ended audio frequency amplifier stage. The stage is schematically represented, since those skilled in the art of amplifying audible and superaudible frequency currents are fully aware of appropriate circuits.

The tube $V_1$ is used to amplify the currents derived from source S. Assuming that the source S is one providing audio frequency currents, the condenser $C_1$ couples the high alternating potential output terminal of the source to the input control electrode 1 of the amplifier tube. The resistor $R_1$ connects the grid 1 to ground to provide a direct current return path for the grid. The cathode 2 of the tube is at a relatively fixed potential, such as ground. The low alternating voltage output terminal of source S is grounded. The anode or output electrode 3 of tube $V_1$ is connected to the $+B$ terminal of the usual direct current supply source (not shown) through a series path consisting of resistors $R_2$ and $R_3$. The screen grid 4 of tube $V_1$ is connected to the $+B$ terminal through resistor $R_4$. The latter is preferably of a magnitude such that the screen grid voltage will be of the desired positive value relative to the positive potential of anode 3. Condenser $C_4$ bypasses the screen grid to ground for alternating currents.

The auxiliary control electrode 5 is coupled by direct current blocking condenser $C_2$ to the junction of resistors $R_2$ and $R_3$. The control electrode 5 is returned to ground by a direct current return resistor $R_5$. The amplifier tube $V_1$ is shown, by way of example, as a pentode type tube. Hence, each of electrodes 1, 4 and 5 is a grid electrode. Moreover, the auxiliary control grid 5 is, in the illustrated embodiment of my invention, in the form of the usual suppressor grid. The anode end of resistor $R_3$ is coupled by direct current blocking condenser $C_3$ to the upper end of a resistor whose lower end is grounded. An intermediate tap on the resistor divides it into two sections $R_7$ and $R_8$. The relative magnitudes of the two resistor sections $R_7$ and $R_8$ depend on the magnitude of alternating voltage to be applied to the input electrode of the inverter tube $V_2$. The latter is shown as a pentode tube, and is preferably of the same characteristics as tube $V_1$. The cathode 6 of tube $V_2$ is connected in common with the cathode 2 to ground.

The input control grid 7 of tube $V_2$ is connected by lead 7' to the junction of resistor sections $R_7$ and $R_6$. The anode 10 is connected through series-arranged resistors $R_5$ and $R_3$ to the +B terminal of the direct current supply source. Screen grid 8 is connected in common with screen grid 4 to the resistor $R_4$. Auxiliary control grid 9, in the form and location of the usual suppressor grid, is connected in parallel with auxiliary grid 5 to the condenser $C_3$. The direct current return $R_8$ connects grid 9 to ground. The phase-inverted alternating voltage at the anode end of resistor $R_5$ is applied to lead 11 by the direct current blocking condenser $C_5$.

The potentials at leads 11 and 11' are intended to be balanced with respect to ground. Hence, the leads may readily feed into respective control grids of push-pull amplifier tubes. The application of the amplified alternating voltage, derived from across resistor section $R_6$, to control grid 7 causes tube $V_2$ to invert the phase of the alternating voltage. The alternating voltage at the anode end of $R_5$ is accordingly of opposite phase or polarity with respect to the alternating voltage at the anode end of resistor $R_2$. The relative magnitudes of the voltages at resistors $R_2$ and $R_5$ are determined in the first instance, assuming that tubes $V_1$ and $V_2$ provide substantial equal amplification, by the position of the tap 12 on resistors $R_7$—$R_6$. Ideally the voltage outputs of tubes $V_1$ and $V_2$ should be maintained equal.

It is desirable to have resistors $R_2$ and $R_5$ of equal magnitudes; they act as the respective load resistors for the tubes $V_1$ and $V_2$. Since resistor $R_3$ is in series with both resistors $R_2$ and $R_5$, there should be no alternating current voltage across $R_3$ if the outputs of the tubes are equal. This follows from the fact that the plate currents of tubes $V_1$ and $V_2$ should be equal and of opposite phase as to their alternating current components. If the tubes are not balanced for some reason, an "unbalance" alternating voltage will appear across $R_3$. "Unbalance" voltage developed across $R_3$ is fed back to the auxiliary grids 5 and 9 through condenser $C_3$. In general, the unbalance voltage will be of such polarity as to cause degeneration in the tube having the greater output, and regeneration in the tube having the lesser output. This dual feedback of opposite senses will tend to equalize any difference in amplitudes of the output of the two tubes.

My invention, therefore, contemplates and provides a self-balancing potential inverter system, wherein preferably auxiliary grids, which may be the usual suppressor grids, of the tubes are used as feedback control elements. It will be observed that the unbalance voltage across $R_3$ is actually applied in like phase to suppressor grids 5 and 9, since they are connected in parallel to condenser $C_3$. Nevertheless, the aforesaid effectively opposed sense feedbacks is secured due to the following action: The unbalance voltage across $R_3$ will have the same phase as the voltage at the anode of the tube having the instantaneously greater output. Hence, the unbalance voltage will be 180 degrees out of phase with the grid voltage of that same tube. Considering the suppressor grid of that same tube as being an auxiliary control grid, the action in that tube (of maximum output) is analogous to the effect which would be obtained if the anode voltage were applied to its input control grid 1 or 7 through a degenerative (resistance-capacity) network.

Consider, now, the action of the other tube at the same instant. Since the two tubes are inversely related in phase, the anode voltages thereof will be 180 degrees out of phase. Therefore, the unbalance voltage at $R_3$ will be 180 degrees out of phase with the alternating voltage at the anode of the tube having the lesser output. If this unbalance voltage were applied through a resistance-capacity network to the control grid of the tube of lesser output, it would be in phase with the grid voltage. Hence, applying the voltage across $R_3$ to the suppressor grid of the tube of lesser output is equivalent to providing regenerative feedback to that tube.

The location of tap 12 on resistor $R_7$—$R_6$ is determined either mathematically or by use of test equipment. By calculating the gain of tube $V_1$ the output voltage of the latter may be determined for any given voltage input. With that value known the tap 12 is located at a point such that the voltage input to the grid 7 of tube $V_2$ is substantially the same as that to the grid 1 of tube $V_1$. This may be measured by means of an oscilloscope, vacuum tube meter, or it may be calculated.

It will be now seen that resistor $R_3$, in a manner of speaking, is able to differentiate between the tubes so far as sense of feedback is concerned because of the simple fact that the tube having the greater instantaneous output is degenerated whereas regeneration of the signal is obtained in the other tube. The tube which is regenerated tends to increase the gain thereof, whereas the gain of the degenerated tube tends to decrease. There is provided, therefore, a substantially effective, simple and economical method of reducing unbalance in the entire system.

While I have indicated and described a system for carrying my invention into effect, it will be apparent to one skilled in the art that my invention is by no means limited to the particular circuit organization shown and described, but that many modifications may be made without departing from the scope of my invention as set forth in the appended claims.

What I claim is:

1. The combination with a signal amplifier tube having input and output electrodes, a phase inverter tube provided with input and output electrodes, means adapted to apply amplified signal voltage at said amplifier output electrodes upon the inverter tube input electrodes, separate output connections from the respective amplifier and inverter tube output electrodes; of the improvement which consists of a resistive impedance common to the space current paths of both tubes adapted to develop voltage in response to the output of one tube exceeding the output of the second tube, and separate parallel connections from said impedance to each tube adapted to apply said last voltage in degenerative phase to said one tube and in regenerative phase to said second tube.

2. The combination with a signal amplifier tube having input and output electrodes and an auxiliary control element, a phase inverter tube also provided with input and output electrodes and an auxiliary control element, means adapted to apply amplified signal voltages at said amplifier output electrodes upon the inverter tube input electrodes, separate output connections balanced relative to ground from the respective amplifier and inverter tube output electrodes; of the improvement which consists of a resistive impedance common to the space current paths of both tubes adapted to develop voltage in response to the output of one tube exceeding the output of the second tube, and respective parallel connections from said impedance to an auxiliary control element of each tube adapted to apply said last voltage in degenerative phase to said one tube and in regenerative phase to said second tube.

3. The combination with a signal amplifier tube having input and output electrodes, a phase inverter tube provided with input and output electrodes, means adapted to apply amplified signal voltage at said amplifier output electrodes upon the inverter tube input electrodes, separate output connections from the respective amplifier and inverter tube output electrodes; of the improvement which consists of a resistive impedance common to the space current paths of both tubes adapted to develop voltage in response to the output of one tube exceeding the output of the second tube, and separate parallel connections from said impedance to each tube adapted to apply said last voltage in degenerative phase to said one tube and in regenerative phase to said second tube, each of said tubes including a suppressor electrode, and each of the feedback connections being made to a respective suppressor electrode.

4. In combination in a system of the type having a pentode amplifier tube having an unbalanced signal input connection to its signal grid, a resistive load connected to the tube plate, a second tube of the pentode type having its cathode connected to the amplifier cathode, means for applying a predetermined magnitude of amplified signal voltage output of the amplifier to the second tube signal grid, a resistive load connected to second tube plate, a separate output voltage connection to each respective resistive load; the improvement which comprises a common signal voltage feedback path from the suppressor grid of each tube to a point common to said two resistive loads.

5. In combination, a signal amplifier tube having input and output electrodes, a second amplifier tube provided with input and output electrodes, means adapted to apply amplified signal voltage at said first amplifier output electrodes upon the second tube input electrodes, separate output connections from the respective amplifier tube output electrodes, a resistive impedance common to the space current paths of both tubes adapted to develop unbalance voltage, parallel connections from said impedance to each tube adapted to apply said unbalance voltage in degenerative phase to one tube and in regenerative phase to the second tube.

6. In combination, an amplifier tube having an unbalanced signal input connection to its signal grid, a resistive load connected to the tube plate, a second tube having its cathode connected to the amplifier cathode, means for applying a predetermined magnitude of amplified signal voltage output of the amplifier to the second tube signal grid, a resistive load connected to second tube plate, a separate output voltage connection to each respective resistive load, and a common signal voltage feedback path from a control grid of each tube to a point common to said two resistive loads.

JAMES BRUCE CRAWLEY.